United States Patent [19]

Kishi

[11] Patent Number: 4,760,410

[45] Date of Patent: Jul. 26, 1988

[54] IMAGE DISPLAY DEVICE

[75] Inventor: Hirotoshi Kishi, Tokyo, Japan

[73] Assignee: Canon Kabushiki Kaisha, Tokyo, Japan

[21] Appl. No.: 6,278

[22] Filed: Jan. 20, 1987

Related U.S. Application Data

[63] Continuation of Ser. No. 641,023, Aug. 15, 1984, abandoned.

[30] Foreign Application Priority Data

Aug. 22, 1983 [JP] Japan ................................ 58-151610
Dec. 2, 1983 [JP] Japan ................................ 58-228688

[51] Int. Cl.$^4$ ................................ G01D 15/06
[52] U.S. Cl. ................................ 346/153.1; 346/160; 355/5; 358/300
[58] Field of Search ................................ 355/3 R, 5, 7; 346/153.1, 160; 358/300

[56] References Cited

U.S. PATENT DOCUMENTS

| | | | |
|---|---|---|---|
| 3,128,683 | 4/1964 | Rubin | 355/5 X |
| 3,660,818 | 5/1972 | Amodei et al. | 355/5 X |
| 3,936,178 | 2/1976 | Kuehnle | 355/5 |
| 3,986,771 | 10/1976 | Tsukada | 355/5 X |
| 4,136,943 | 1/1979 | Koizumi | 355/5 |
| 4,286,864 | 9/1981 | Lysle et al. | 355/5 |
| 4,322,157 | 3/1982 | Miura et al. | 355/7 X |
| 4,582,417 | 4/1986 | Yagasaki et al. | 355/7 |
| 4,659,210 | 4/1987 | Sugiura et al. | 355/7 X |

*Primary Examiner*—Fred L. Braun
*Attorney, Agent, or Firm*—Fitzpatrick, Cella, Harper & Scinto

[57] ABSTRACT

An image display device includes an image carrier, an image forming station for forming an erasable image on the image carrier, a display station for visually displaying the image formed on the image carrier, and a read station for reading out the image on the image carrier and converting the image to an image signal.

22 Claims, 15 Drawing Sheets

IMAGE DISPLAY DEVICE

This application is a continuation of application Ser. No. 641,023 filed Aug. 15, 1984, now abandoned.

BACKGROUND OF THE INVENTION

1. Field of the Invention

The present invention relates to an image display device using an electronic photographic method, and more particularly to an image display device for displaying an image formation of an information processing system such as a computer as a visual image.

2. Description of the Prior Art

An electronic photographic method and an image display device disclosed in Japanese Patent Application Laid-Open No. 98746/1983 and Japanese Patent Application No. 151278/1982 proposed by the assignee of the present invention are explained with reference to FIG. 1.

FIG. 1 is a side elevational view of an image display device. An endless photoconductor belt 8 which serves as an image carrier and is guided by guide rolls 9, 10, 11 and 12 and intermittently driven by drive means (not shown) is arranged in a case 1, an output light from a semiconductor laser (not shown) modulated by an image electrical signal is scanned unidirectionally by a scanner 5, and a back side of the photoconductor belt 8 is illuminated by the output light through an f-$\theta$ lens 6 and a mirror 7. The photoconductor 8 may comprise a photoconductive layer formed on a transparent and conductive base.

A developing unit 15 having a sleeve 17 including a magnet 16 rotated in a direction of an arrow is arranged to face the surface of the photoconductor belt 8 at an exposure position A, and a conductive and magnetic developing agent 18 supplied onto the surface of the sleeve is uniformly restricted by a blade 19 and contacts the surface of the photoconductor. A D.C. voltage is applied between the sleeve of the developing unit and the substrate of the photoconductor by a D.C. power supply (not shown), and rollers 13 and 14 are arranged rear behind the exposure and developing position so that the photoconductor belt 8 is kept flat to more precisely keep the distance between the photoconductor surface and the developer sleeve. The toner image formed on the photoconductor belt by the beam irradiation at the position A facing the developing unit 15 is fed to a display station 2.

The display station 2 comprises a square window opening 3 in a front side of the case 1 and a glass or synthesized resin transparent member 4 which covers the window opening 3 so that the toner image on the photoconductor can be directly viewed externally. When the predetermined visual image area aligns with the position of the window opening 3, the photoconductor 8 is stopped for a selected time period automatically or by switch operation. The toner image on the photoconductor surface is viewed through the transparent member 4 and the window opening 3.

A lamp 20 is provided as required to erase previously developed images from the photoconductor. It is lit only during the movement of the photoconductor belt and turned off when it is stopped.

When the display content is to be changed, the photoconductor 8 is moved and the photoconductor having the toner image thereon can be used again as it is. Accordingly, a cleaner for erasing the toner image is not necessary.

The principle of the image formation applied to the above image display device is disclosed in Japanese Patent Application Laid-Open No. 98746/1983 and Japanese Patent Application No. 151278/1982. A brief explanation is given here with reference to FIGS. 2 and 3.

FIG. 2 shows charges in a light area of an information light. As the tner 18 having a voltage applied thereto through the sleeve 17 contacts to the photoconductor, an electric field is applied to a photoconductive layer 8_c_. If the information light is irradiated, photo-carriers e are created in the photoconductive layer 8_c_ and they are guided to the vicinity of the surface of the photoconductive layer 8_c_ under the action of the electric field. As a result, a strong elastrostatic force of attraction acts between the toner 18 conveyed on the sleeve by the magnetic force of the rotating magnet 16 and the photoconductive layer 8_c_ so that the toner 18 is deposited to the photoconductive layer 8_c_ on the surface of the photoconductor 8. The sleeve 17 may be rotated instead of the magnet.

In the illustrated example, the photoconductive layer 8_c_ is an N-type semiconductor and a positive voltage is applied to the toner 18. Therefore, the carriers e created in the vicinity of the substrate in the photoconductive layer 8_c_ by the illumination of the information light L are guided toward the surface of the photoconductive layer 8_c_. As a result, the strong electrostatic force of attraction acts between the toner 18 and the photoconductor 8 and the toner 18 is deposited on the photoconductor.

FIG. 3 shows charges in a dark area. Because of the electric field applied between the toner 18 and the transparent conductive layer 8_b_ of the substrate, an electrostatic force of attraction acts therebetween. However, the force is weak because the photoconductive layer 8_c_ is present therebetween and they are distant from each other. Accordingly, the toner 18 is removed from the photoconductive layer or the surface of the photoconductor 8 by the magnetic force of the rotating magnet 16 arranged in the sleeve 17 and the deposition force among the particles of the toner 18.

When the tner image on the photoconductor 8 is to be changed, a new image can be formed by moving the image area past the exposure position. If a toner bearing area of the photoconductor is to be changed to a non-bearing area, the toner 18 having the electrostatic force of attraction reduced is removed by the magnetic field of the magnet 16 and a light area having no toner deposited thereon is formed. On the other hand, when the toner is to be maintained, the carriers e are again injected by the information light and the toner 18 is carried against the magnetic field so that the toner is maintained. Accordingly, the toner image on the photoconductor surface does not affect the next image formation and no separate cleaning means is necessary.

In FIGS. 2 and 3, numeral 8_a_ denotes a polyethylene terephthalate film which supports the transparent and conductive layer 8_b_, and E denotes a power supply for applying a voltage to the sleeve. The photoconductive layer may be a CdS layer or ZnO, Se, SeTe or $AS_3Se_2$ layer used in the prior art electro-photographic process.

In the image display device of this type, the image carrier such as the photoconductor belt on which the images are formed is repeatedly used as the belt is rotated, and the image carrier 8 is repeatedly bent and deformed. This more or less affects the durability of the image carrier 8. The image carrier 8 which is repeatedly stressed will be subject to cracks, defects, breaks or tears and finally lose the function of carrying an image. In addition, because of the belt structure, a deskew mechanism is required. Thus, the device is complicated. Contamination by the scattering of toner as the photoconductor rotates also raises a problem.

In the image display device of this type, a total updating of the displayed image is attained but a partial updating of the displayed image is not attained.

SUMMARY OF THE INVENTION

It is an object of the present invention to provide an image display device capable of editing a displayed image.

It is another object of the present invention to provide an image display device capable of reading out a displayed image.

It is another object of the present invention to provide an image display device using an electronic photographic method, which allows a partial updating, a partial erasing of a displayed image or additional writing of an image, and displaying the edited image as required.

Another object of the present invention is to provide an image display device capable of reading out and storing a displayed image.

Still another object of the present invention is to provide an image display device having an image carrier with a long durability and a high reliability.

A further object of the present invention is to provide an image display device of a simple construction.

It is another object of the present invention to provide an image display device capable of redisplaying a displayed image.

Yet another object of the present invention is to provide an image display device capable of modifying a portion of a displayed image.

Other objects of the present invention will be apparent from the following description of the invention.

DETAILED DESCRIPTION OF THE PREFERRED EMBODIMENT

Figure 1:
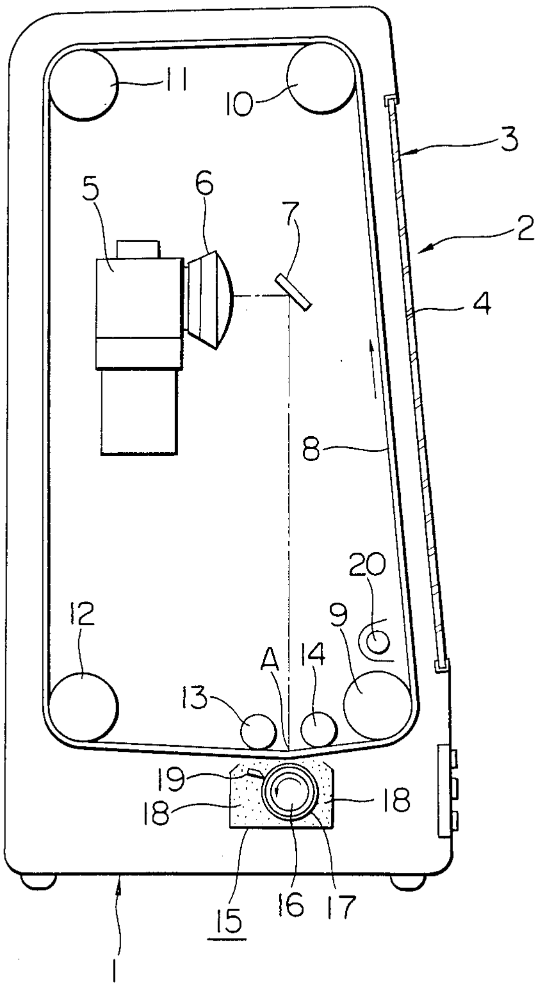
FIG. 1 PRIOR ART
FIG. 1 is a sectional view of a major portions of a prior art image display device.
Figure 2:
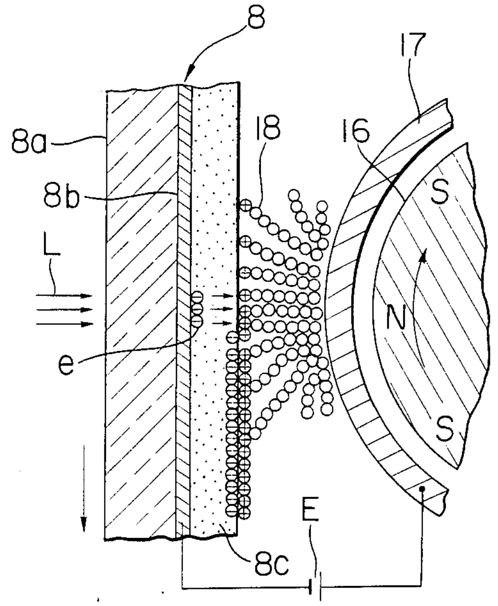
FIGS. 2 and 3 illustrate an image formation method applicable to a display device of the present invention.
Figure 3:
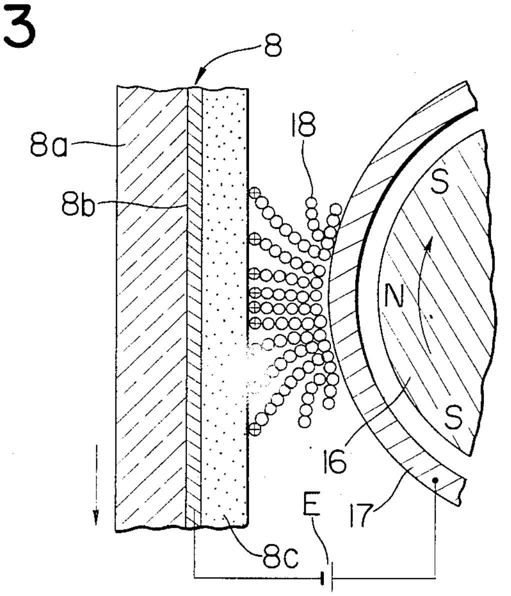
Figure 4:
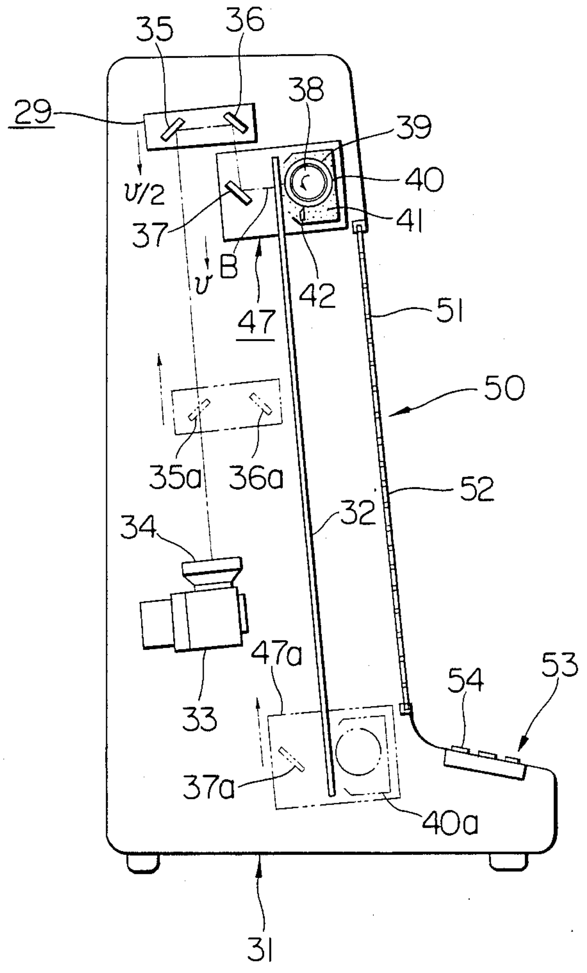
FIG. 4 is a sectional view of major portions of a first embodiment of the image display device of the present invention.
Figure 5:
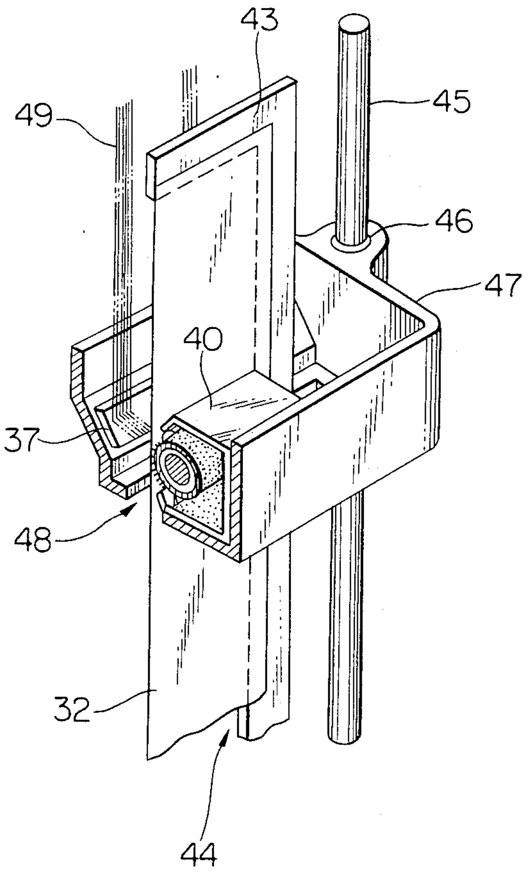
FIG. 5 is a partial perspective view of a developing unit.

FIG. 4 shows a side elevational view of a first embodiment of the present invention and FIG. 5 is a perspective view showing a portion of FIG. 4 wherein a photoconductor 32 is arranged in a case 31 and an output light from a semiconductor laser (not shown) modulated by an image electrical signal is unidirectionally scanned by a scanner 33 to irradiate a back side (first side) of the photoconductor 32 through an f-$\theta$ lens 34 and mirrors 35, 36 and 37. The mirror 37 and the mirrors 35 and 36 are reciprocated at speeds of v and v/2, respectively, between positions shown by solid lines and positions 35*a*, 36*a* and 37*a* shown by double-dot lines. In this manner, the optical path length is always kept constant. The photoconductor 32 comprises a photoconductive layer formed on a transparent and conductive substrate.

A drive mechanism for the mirrors 35, 36 and 37 may be an optical system of a prior art electronic photographic copier in which an original document table (base) is fixed and a first mirror and a second mirror are moved at a speed ratio of two to one. As shown in FIG. 4, the mirrors 35 and 36 are fixed to a first support table 29 and the mirror 37 is fixed to a second support table 47. The first and second support tables 29 and 47 are moved along a bar-like guide means 45.

Figure 6:
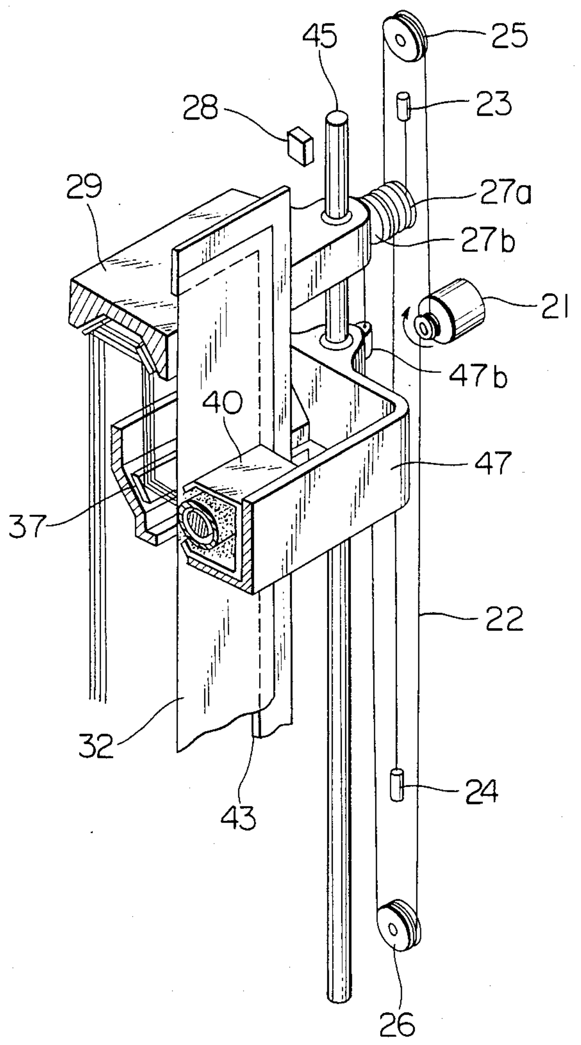
FIG. 6 is a prespective view of a drive mechanism for an optical system and developing means.

FIG. 6 shows a drive mechanism for the first and second support tables 29 and 47.

The tables 29 and 47 are driven by a reversible motor 21 and a wire 22 for transmitting the rotation of the motor. Ends 23 and 24 of the wire 22 are fixed to a main frame and the wire 22 is spanned by rotary pulleys 25 and 26 pivotably supported by the main frame. Two pulleys 27*a* and 27*b* are mounted on the table 29, and the one end 23 of the wire is suspended by the pulley 27*a* while the other end 24 of the wire is suspended by the pulley 27*b* and locked by a portion 47*b* of the second support table 47.

As the motor 21 rotates in a direction of an arrow, the first and second support tables 29 and 47 are moved down at a speed ratio of two-to-one. Numeral 28 denotes a sensor such as a microswitch or a photocoupler. It is used to set an upper limit position of the first support table 29. A similar sensor (not shown) is arranged at a bottom to set a lower limit position.

A developing unit 40 having a magnet 38 rotating in a direction of an arrow and a non-magnetic sleeve 39 is arranged on a second surface of the photoconductor 32 opposite the first surface and facing an exposure position B. A conductive and magnetic toner 41 supplied to the surface of the sleeve is uniformly restricted by a blade 42 and contacts the surface of the photoconductor. A D.C. voltage is applied by a D.C. power supply (not shown) between the sleeve 39 of the developing unit and the substrate of the photoconductor 32.

The developing unit 40 is moved in union with the exposure position with the distance between the second surface of the photoconductor 32 and the sleeve 39 being kept precisely constant.

FIG. 5 is a partial perspective view of an embodiment of a structure for maintaining a precise positional relationship between the exposure position and the developing position. The photoconductor 32 is fixedly arranged to face a square window opening 44 formed at a center of a support member 43 fixed to the case. Guide means 45 is fixedly arranged along the photoconductor 32. A table 47 is slidably held by the bar-like guide means 45 through a slide bearing 46. The table 47 can be reciprocated by the drive source through the pulleys and the wire. The mirror 37 and the developing unit 40 are fixedly attached to the table 47. The photoconductor 32 is moved through a slit opening 48 formed in the table 47 between the mirror 37 and the developing unit 40. In this manner, the exposure position of the light beam 49 and the developing unit 40 are moved in union with the positional relationship being maintained. The toner image is serially formed on the surface of the photoconductor 32 from one edge thereof. At the end of the series of image formation, the table 47 is stopped at the other edge of the photoconductor 32 by sensor means.

When the display content is to be changed, the table 47 is returned to the start position and the image formation process is repeated. By using the above image forming process, the photoconductor bearing the toner image on the surface thereof can be reused and a cleaner for erasing the toner image is not necessary.

In the display device of FIG. 4, a display station 50 is formed to allow an observer to view the toner image formed on the second surface of the photoconductor 32. The display station 50 comprises a square window opening 51 in a front side of the case 31 and a transparent member 52 covering the window opening 51. The toner image on the photoconductor 32 can thus be directly viewed externally.

The operation of the device is now explained. As an operator manipulates a display key 54 arranged on a control panel 53, the mirrors 35 and 36 and the table 47, that is, the mirror 37 and the developing unit 40 start to move from the solid line positions. When they reach the double-dot chain line positions 35*a*, 36*a*, 47*a*, 47*a*, and 40*a*, they are stopped there. During this period, the information light modulated by the image electrical signal irradiates and scans the back side of the photoconductor 32 so that the toner image is serially formed on the opposite surface. Thus, the toner image on the photoconductor 32 can be directly viewed externally through the transparent member 52 of the display station 50.

When the display content is to be changed, the above process is repeated.

Figure 7:
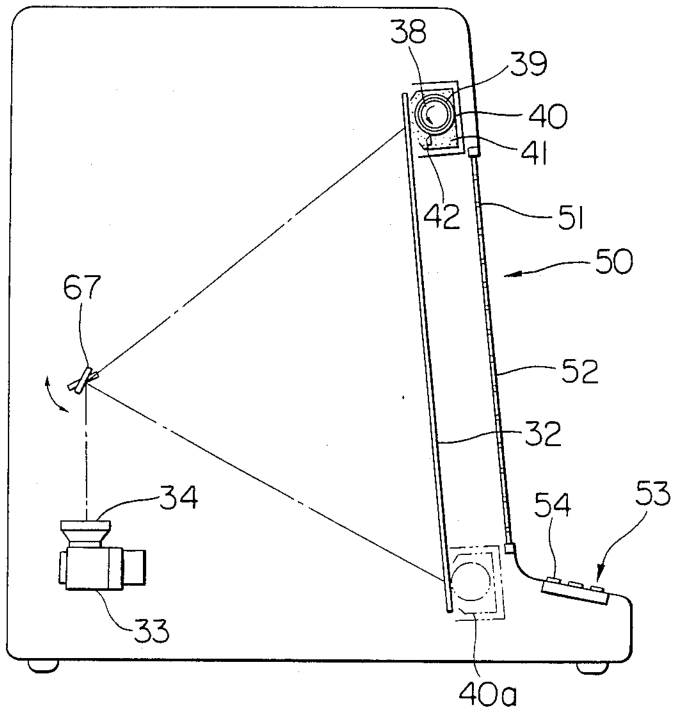
FIGS. 7 and 8 show sectional views of major portions of second and third embodiments of the image display device of the present invention.

In the present embodiment, the exposure means includes the mirrors moved at a speed ratio of two-to-one. Alternatively, as shown in FIG. 7, a single mirror 67 may be arranged to rotate around an axis which is horizontal and parallel to the photoconductor, and the mirror is rotated to deflect the light beam from the scanner to the entire area of the photoconductor.

When such a rotating mirror is used to scan the light beam across the planer photoconductor, it is necessary to rotate the mirror at a nonuniform angular velocity so that the photoconductor is scanned at a uniform velocity. This may be achieved by a mechanism shown in U.S. Pat. No. 4,216,378. The synchronization between the exposure position and the developing unit may be achieved by the synchronization by the above arrangement at the writing of the image. In order to focus the light beam, it is scanned within a depth of focus of the f-$\theta$ lens or an additional lens may be arranged between the mirror 67 and the photoconductor 32.

Figure 8:
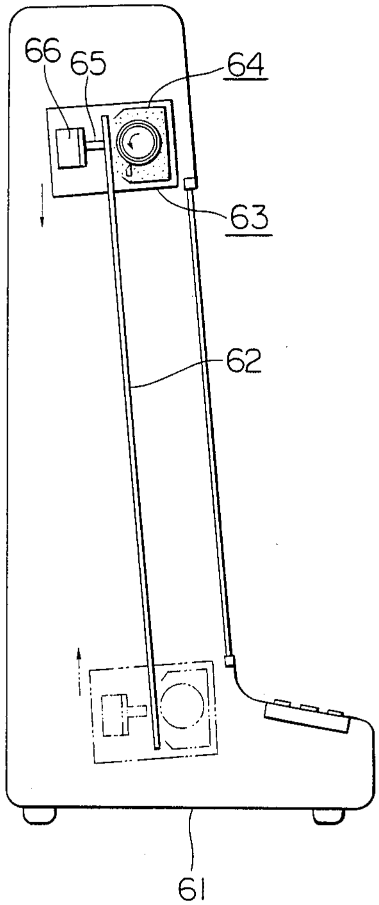

FIG. 8 shows a third embodiment of the present invention. In the present embodiment, a well-known LED array is used as the light information irradiation means. A photoconductor 62 is fixedly arranged in a case 61. A developing unit 64 is fixed on a surface of a table 63 facing the photoconductor 62. The table 63 is movable along the photoconductor 62. An LED array 65 and a driver 66 therefor are arranged on the back side of the photoconductor 62 to face the developing unit 64. The LED array 65 is turned on and off in accordance with an image electrical signal. The developing unit 64 and the LED array 65 are moved in unison. Those elements which are not specifically explained here are identical to those shown in FIGS. 4 and 5.

Instead of the LED array, a linear light source and an optical shutter array such as PLZT may be used as the light information irradiation means and the optical shutter array may be controlled by the image electrical signal.

In the above embodiments, the irradiation means and the developing means are mounted on the common table so that they are moved in unison. Alternatively, the irradiation means and the developing means may be mounted on different tables which are synchronously moved by a wire and ball screws.

In the above arrangement, the image carrier is not moved but stationary and not bent or deformed. Accordingly, the image carrier is not likely to be cracked, broken or torn off and the durability is significantly improved.

Since the image carrier is not moved, the scattering of the toner due to the bend and the deformation of the image carrier does not occur. Since the image carrier divides a space into a toner handling area and an optical system area, the contamination of the light information irradiation means by the toner is prevented.

In the present embodiment, the second surface of the photoconductor may be colored white or a light color to give a high contrast to the toner color. A thin surface layer may be provided.

An image display device capable of editing a displayed image is now explained.

Figure 9:
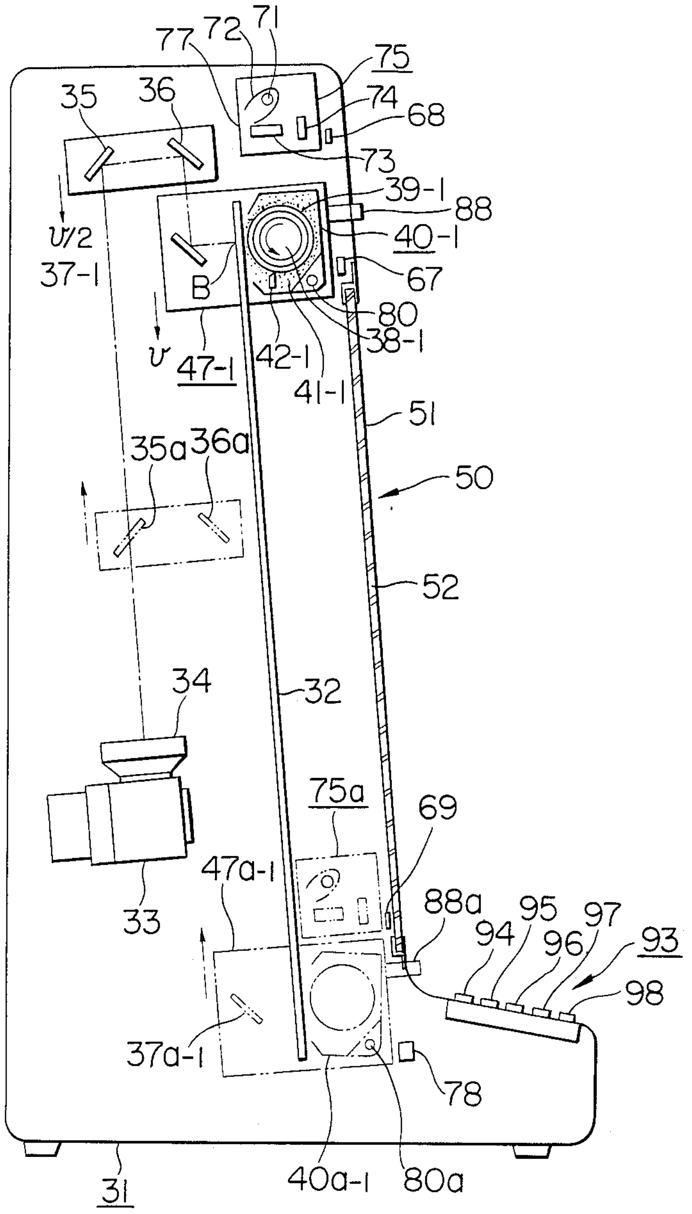
FIG. 9 is a sectional view of a fourth embodiment of the image display device of the present invention.

FIG. 9 is a side elevational view of a fourth embodiment of the image display device of the present invention. The elements having like functions to those shown in FIG. 4 are designated by like numerals.

In FIG. 9, a photoconductor 32 is fixedly arranged in a case 31 and an output signal light from a semiconductor laser (not shown) modulated by an image electrical signal is unidirectionally scanned by a scanner 33 to irradiate a back side of the photoconductor 32 through an f-$\theta$ lens 34 and mirrors 35, 36 and 37-1.

The mirror 37-1 is moved at a velocity v and the mirrors 35 and 36 are moved at a velocity v/2 between the solid line positions and the double-dot chain line positions 35*a*, 36*a* and 37*a*-1 with an optical path length being kept constant.

The photoconductor 32 may comprise a photoconductive layer deposited on a transparent and conductive substrate.

A developing unit 40-1 having a magnet 38-1 rotating in a direction of an arrow and a sleeve 39-1 are arranged on the second opposite surface of the photoconductor 32 facing an exposure position B. A conductive and magnetic toner 41-1 supplied onto the surface of the sleeve 39-1 is uniformly restricted by a blade 42-1 arranged to keep a small distance from the sleeve 39-1, and contacts the surface of the photoconductor 32. A D.C. voltage is applied by a D.C. power supply (not shown) between the sleeve 39-1 of the developing unit and the substrate of the photoconductor 32.

The developing unit 40-1 is moved in unison with the exposure position while the distance between the second surface of the photoconductor 32 and the sleeve 39-1 and kept precisely constant.

Figure 10:
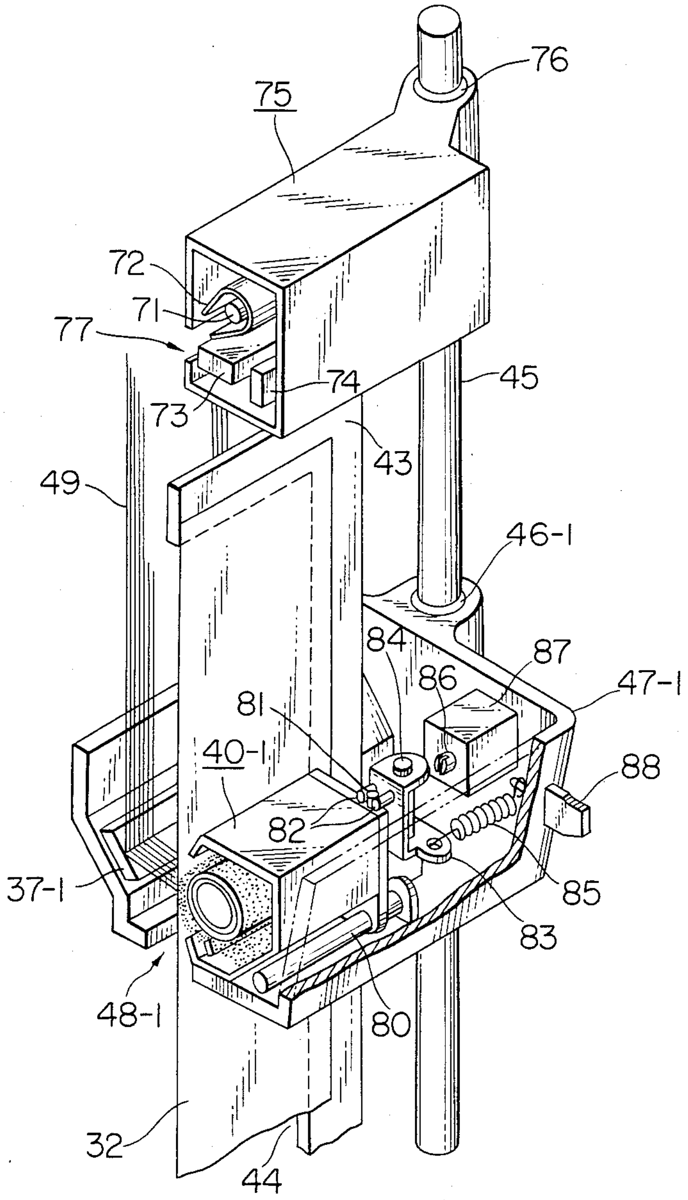
FIG. 10 is a partial perspective view of a developing unit and a reader unit, FIG. 11 composed of FIGS. 11A and 11B is an electronic circuit diagram of the image display device shown in FIG. 9, and FIGS. 12 to 15 show control flow charts in the present embodiment.

FIG. 10 is a partial perspective view of one embodiment of a developing unit and a reader unit. In FIG. 10, the photoconductor 32 is fixed to a support member 43 fixedly arranged in the case 31 to face a square window opening 44 formed at a center of the support member 43.

Guide means 45 for the mirror 37-1 and the developing unit 40-1 is fixedly arranged along the photoconductor 32. A table 47-1 is slidably held by the guide means 45 through a bearing 46-1. The table 47-1 can be reciprocated by a drive source (not shown) through pulleys and a wire. The mirror 37-1 and the developing unit 40-1 are mounted on the table 47-1. The photoconductor 32 is moved through a slit opening 48-1 formed in the table 47-1 between the reciprocating mirror 37-1 and the developing unit 40-1.

In this manner, the irradiation position of the light beam and the developing unit 40-1 are moved in unison with the positional relationship therebetween being maintained. Thus, the toner image is serially formed on the surface of the photoconductor 32 from one edge thereof until the mirrors 35, 36 and 37-1 and the developing unit 40-1 reach the double-dot chain line positions (see FIG. 9).

A display station 50 is similar to that shown in FIG. 4 and hence it is not explained here.

A control panel 93 is arranged near the display station 50. A display key 94 and an edit key 95 to be explained later are arranged on the control panel 93.

As shown in FIGS. 9 and 10, image readout means 75 including a light source 71, a reflector 72, a short focal length lens array 73 and an elongated image sensor 74 is arranged above the table 47-1. The image readout means 75 is slidably held by the guide means 45 through the bearing 76, and the image readout means 75 can be reciprocated by a drive means (not shown) through pulleys and a wire.

A slit-shaped opening 77 is formed in the image readout means 75 on the surface facing the photoconductor 32, and the image formed on the photoconductor 32 is focused on the elongated image sensor 74 by the short focal distance lens array 73 through the opening 77.

A position sensor 78 for detecting the lowermost position (double-dot chain line position **47*a*-1) of the table 47-1 is arranged in the case 31, as shown in FIG. 9. When the position sensor 78 detects that the table 47-1 is at the lowermost position, the image readout means 75 is allowed to be moved along the photoconductor 32**.

Numeral 67 denotes a position sensor for detecting whether or not the table 47-1 is at the home position (solid line position). The position sensor 78 detects whether or not the table 47-1 is at the back position (double-dot chain line positions **47*a*-1**).

Numeral 68 denotes a position sensor for detecting whether or not the image readout means 75 is at the home position (solid line position), numeral 69 denotes a position sensor for detecting or not the image readout means 75 is at the back position (double-dot chain line position **75*a***).

Figure 11A:
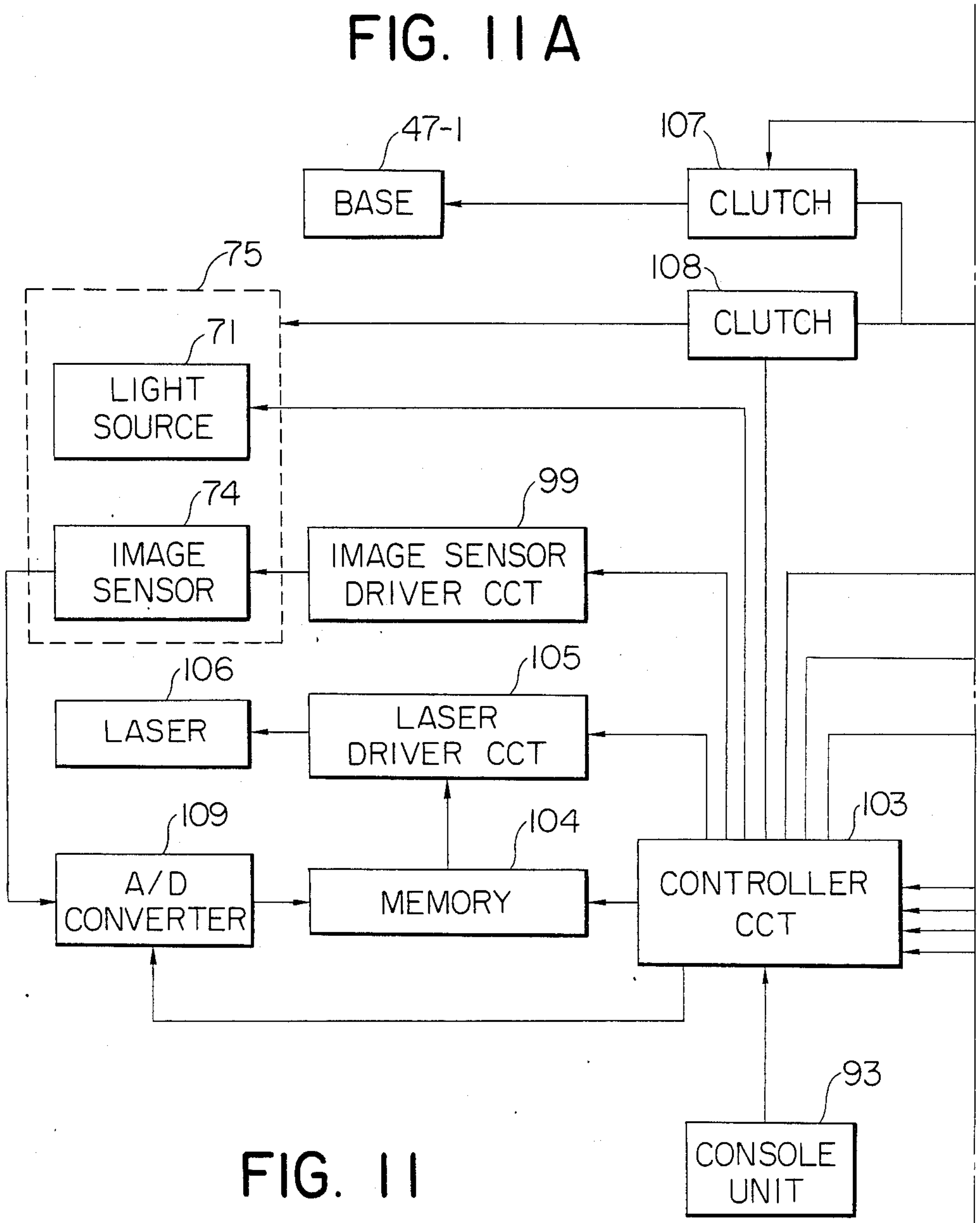
Figure 11:
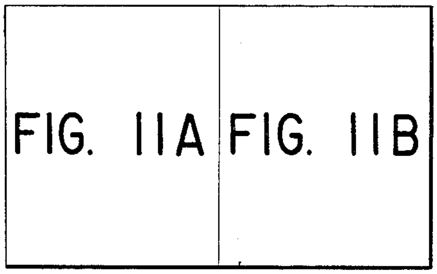
Figure 11B:
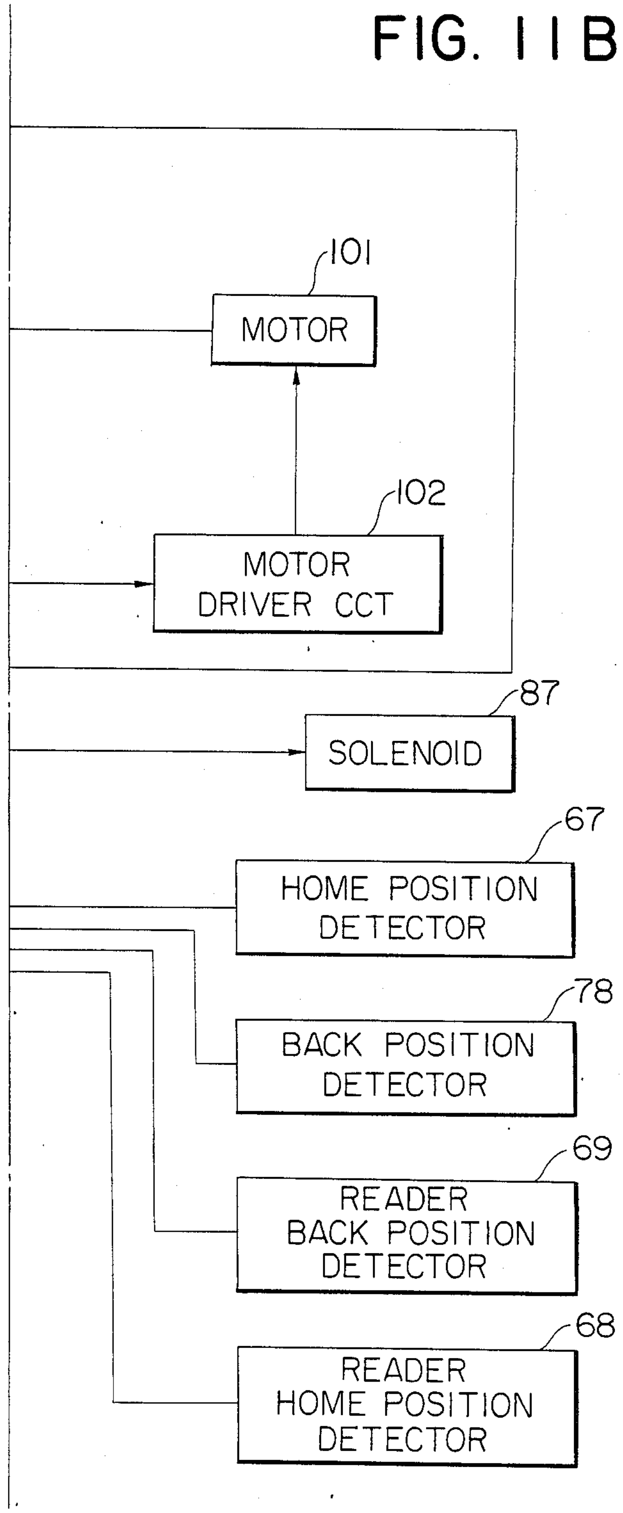

FIG. 11 shows an electrical circuit diagram of the image display device shown in FIG. 9. Numeral 93 denotes a console unit including display designation means, edit designation means and image signal source designation means. Those designation means may comprise key switches. Numeral 103 denotes a control circuit including sequence control means, numeral 104 denotes a plural-page memory, numeral 105 denotes a laser driver circuit which, together with a laser 106, forms a portion of the image formation means.

Numeral 99 denotes an image sensor driver circuit which, together with the elongated image sensor 74, forms a portion of the image readout means 75.

A drive source (motor) 101 and a drive source driver circuit 102, together with a clutch 107, form the drive means for the mirrors 35 and 36 and the table 47-1, and, together with a clutch 108, form the drive means for the image readout means 75.

A sequence signal supplied from the control circuit 103 is applied to the solenoid 87, the light source 71 and the clutches 107 and 108. The outputs from the position sensors 67 through 69 and 78 are supplied to the control circuit 103. The image electrical signal from the image sensor 74 is stored in a memory 104 through an A/D converter 109.

The developing unit 40-1 can assume a first position close to the photoconductor 32 (solid line position in FIG. 9) and a second position (double-dot chain line position in FIG. 9) farther from the photoconductor 32 than in the first position.

At the first position, the toner 41-1 uniformly restricted by the blade 42-1 contacts the surface of the photoconductor 32. On the other hand, at the second position, the toner 41-1 avoids contact with the surface of the photoconductor 32. As shown in FIG. 10, the developing unit 40-1 is pivotably supported by a shaft 80 which extends through corners of end plates (one of which is shown in FIG. 10) arranged on the opposite sides of the developing unit 40-1.

A pin 81 is fixed at the top of the developing unit 40-1. A plate 83 having two pins 82 which fit around pin 81 is pivotable around a stationary shaft 84. A resilient member 85 is attached to one end of the plate 83 and the developing unit 40-1 is normally biased to the second position by a biasing force of the resilient member 85. The other end of the plate 83 is connected to a plunger 86 of the solenoid 87. The plunger 86 is retracted only when the solenoid 87 is energized so that the plate 83 is rotated against the biasing force of the resilient member 85. The rotation is transmitted to the developing unit 40-1 through the pins 82 and 81 so that the developing unit 40-1 assumes the first position.

The table 47-1 is manually moved except when the image is formed. In the image formation process, the rotation of the drive source 101 shown in FIG. 11 is transmitted to the table 47-1 through the clutch 107, and the pulleys and the wire (not shown). The table 47-1 is thus moved while it is guided by the guide means 45.

On the other hand, during the non-image formation period, the clutch 107 is disconnected and the table 47-1 can be manually moved through a knob 88 formed on the table 47-1. The knob 88 projects outward through a slit-shaped opening (not shown) formed near the window opening 51 in the display station 50 so that it can be manipulated from the front of the device. The operation of the present embodiment is now explained.

A normal display process is first explained. As an operator manipulates the display key 94 arranged on the console unit 93, the mirrors 35 and 36 and the table 47-1 start to move from the solid line positions shown in FIG. 9, and they are stopped at the double-dot chain line positions shown in FIG. 9.

During this period, the solenoid 87 is energized and the developing unit 40-1 is kept at the first position. The output signal light modulated by the image electrical signal irradiates and scans the back side of the photoconductor 32 so that the toner image is serially formed on the opposite surface. Thus, the toner image on the photoconductor 32 can be directly viewed externally through the transparent member 52 of the display station 50.

At the end of the image formation process, the solenoid 87 is deenergized and the developing unit 40-1 assumes the second position.

When the display content is to be changed, the above process is repeated. As the display command is inputted through the display key 94, the mirrors 35a and 36a and the table 47a-1 which were at the dual-dot chain line positions of FIG. 9 are returned to the solid line positions and the image formation process is repeated.

An editing process such as partial updating or partial erasing of the displayed image or addition of an image now is explained. After the normal display process, the operator manipulates the edit key 95 arranged on the console unit 93 to select the edit mode. Then, the table 47-1 is manually moved to a desired edit position by the knob 88 while the operator watches the displayed image. During this period, the developer 40-1 is kept at the second position so that the previously displayed image is not disturbed. Then, the signal source selection key 96 is manipulated to select the image signal to be edited. A desired page is selected from the plural-page memory (not shown), a desired pattern is selected from a character generator (not shown) or an external video signal source is selected and designated.

Then, the start key 97 is manipulated. Thus, the mirrors 35 and 36 and the table 47-1 are moved from the desired position without being returned to the solid line positions shown in FIG. 9 to start the image forming process. The solenoid 87 is engerized and the developing unit 40-1 assumes the first position. The output signal light modulated by the image electrical signal from the designated signal source irradiates and scans the back side of the photoconductor 32, and the toner image is serially formed on the opposite surface.

The image formation is carried out during the depression of the start key 97. When the operator stops to depress the start key 97, the image formation is stopped and the developing unit 40-1 assumes the second position. In this manner, the partial updating or the partial erasing of the displayed image or the addition of the image can be carried out in accordance with the designated signal source.

Thereafter, the operator moves the table 47-1 by the knob 88 beyond the effective display area. During this period, the developing unit 10 is kept at the second position so that the displayed image is not disturbed.

The toner image on the photoconductor 32 thus edited can be directly viewed externally through the transparent member 52 of the display station 50.

A process to store the edited image now is explained. The operator checks whether or not the table 47-1 is at the lowermost position (double-dot chain line position in FIG. 9), and if it is not, moves the table 47-1 by the knob 88 to set the table 47-1 to the lowermost position. This is detected by the positio sensor 78 (see FIG. 9).

The operator then manipulates the memory key 98 of the console unit 93. Thus, the image readout means 75 which is normally stopped at the uppermost position as shown in FIG. 9 starts to move downward. The rotation of the drive source 101 shown in FIG. 11 is transmitted to the image readout means 75 through the clutch 108 and transmission means (not shown) such as pulleys and a wire. Thus, the image readout means 75 is guided by the guide means 45 and smoothly moved along the photoconductor 32.

During this movement, the light source 71 remains lit and the image formed on the photoconductor 32 is focused on the elongated image sensor 74 by the short focal distance lens array 73. The image electrical signal from the image sensor 74 is stored in the memory 104 through the A/D converter 109.

As the image on the photoconductor 32 has been read out, the image readout means is reset to the initial position and stopped there. In order to redisplay the image stored in the memory 104, a desired page of the memory 104 is designated and the normal display process is started.

Figure 12:
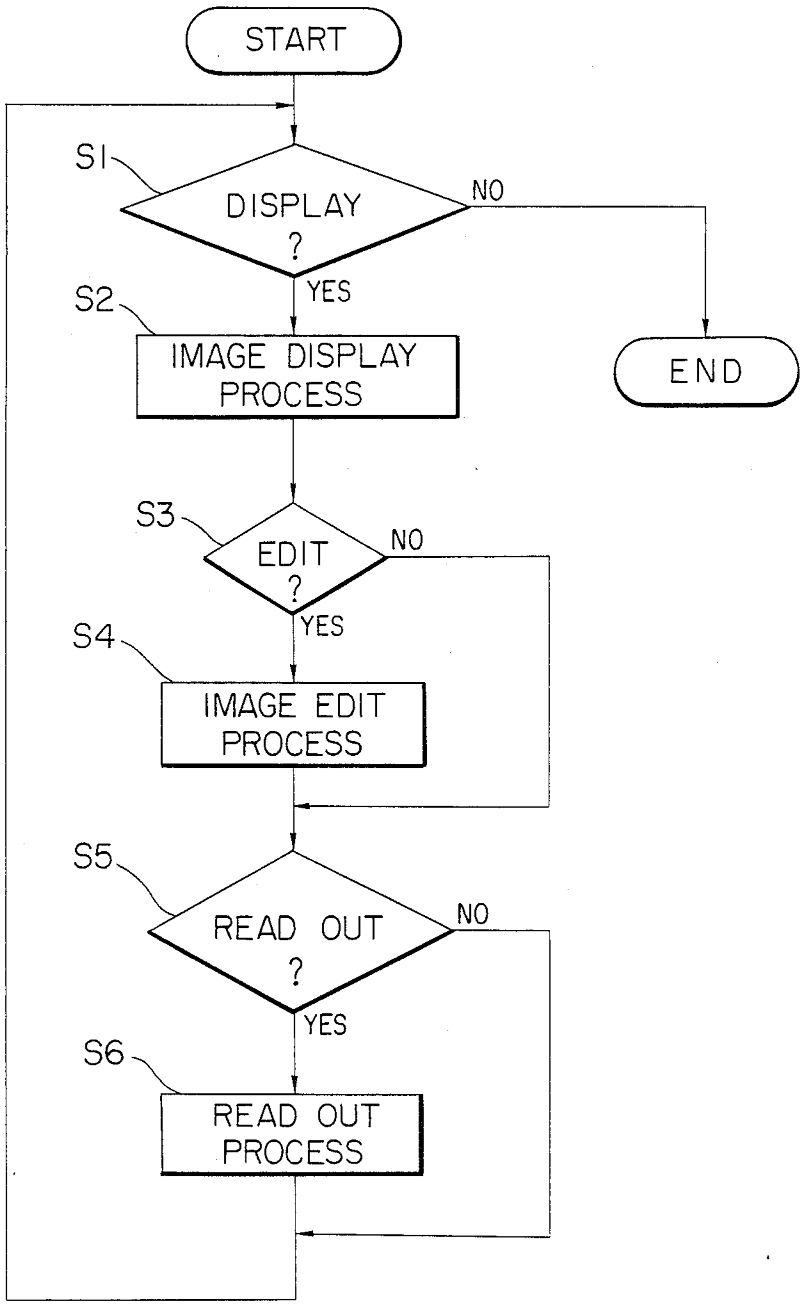

FIG. 12 shows a general flow chart of the control procedure described above. It is stored in a ROM of the control circuit 103 as a program.

In a step S1, whether nor not the image is to be displayed (whether or not the display key 94 has been depressed) is checked, and if YES, the image display process is carried out in a step S2.

In a step S3, whether or not the displayed image is to be edited (whether or not the edit key 95 has been depressed or not) is checked, and if YES, the image edit process is carried out in a step S4. If the edition is not required, the step S4 is not carried out and the program proceeds to a step S5.

In a step S5, whether or not the edited image or the unedited image is to be read out (whether or not the memory key 98 has been depressed or not) is checked, and if YES, the readout process is carried out in a step S6. If the readout is not required, the step S6 is not carried out but jumped over.

When the image is to be displayed again, the program returns to the step S1 and the above process is repeated.

Figure 13:
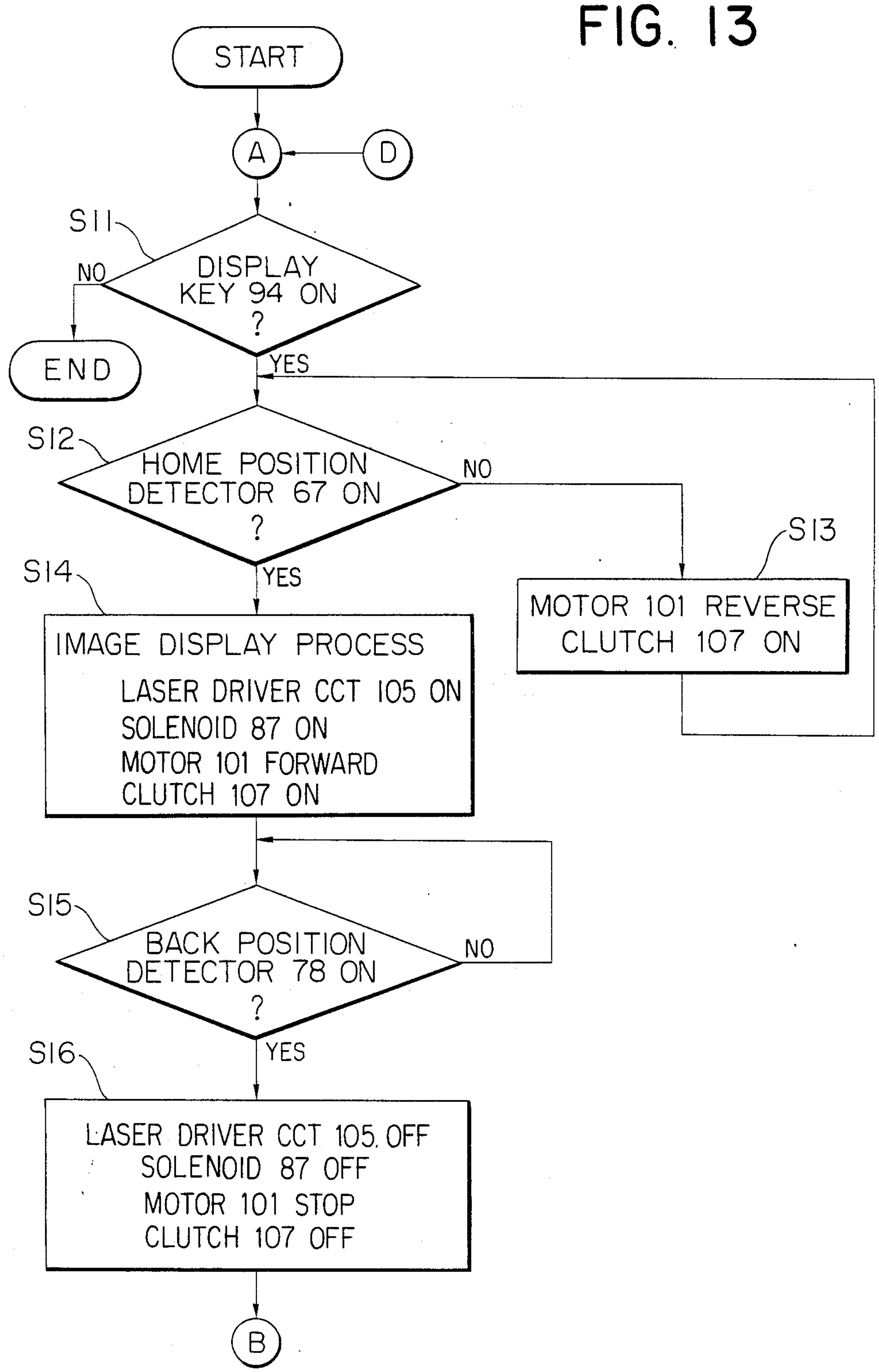

FIG. 13 is a flow chart for the display process in FIG. 12.

In a step S11, the entry of the display key 94 is checked, and if it has been entered, whether or not the table 47-1 is at the home position (solid line position in FIG. 9) is checked by the position sensor 67 in a step S12.

If the table 47-1 is not at the home position, the rotation of the drive source 101 is reversed and the clutch 107 is connected in a step S13. The table 47-1 is thus returned to the home position (solid line position in FIG. 9). When the position sensor 67 detects that the table 47-1 is at the home position, the program proceeds to a step S14 to carry out the image display process.

The laser drive circuit 105 and the solenoid 87 are energized, the drive source 101 is rotated forward and the clutch 107 is connected. Thus, the table 47-1 is moved to the back position (double-dot chain line in FIG. 9). If the position sensor 78 detects that the table 47-1 is at the back position in a step S15, the program proceeds to a step S16.

In the step S16, the laser drive circuit 105 and the solenoid 87 are deenergized. The drive source 101 is stopped and the clutch 107 is disconnected. The table 47-1 is thus stopped.

Figure 14:
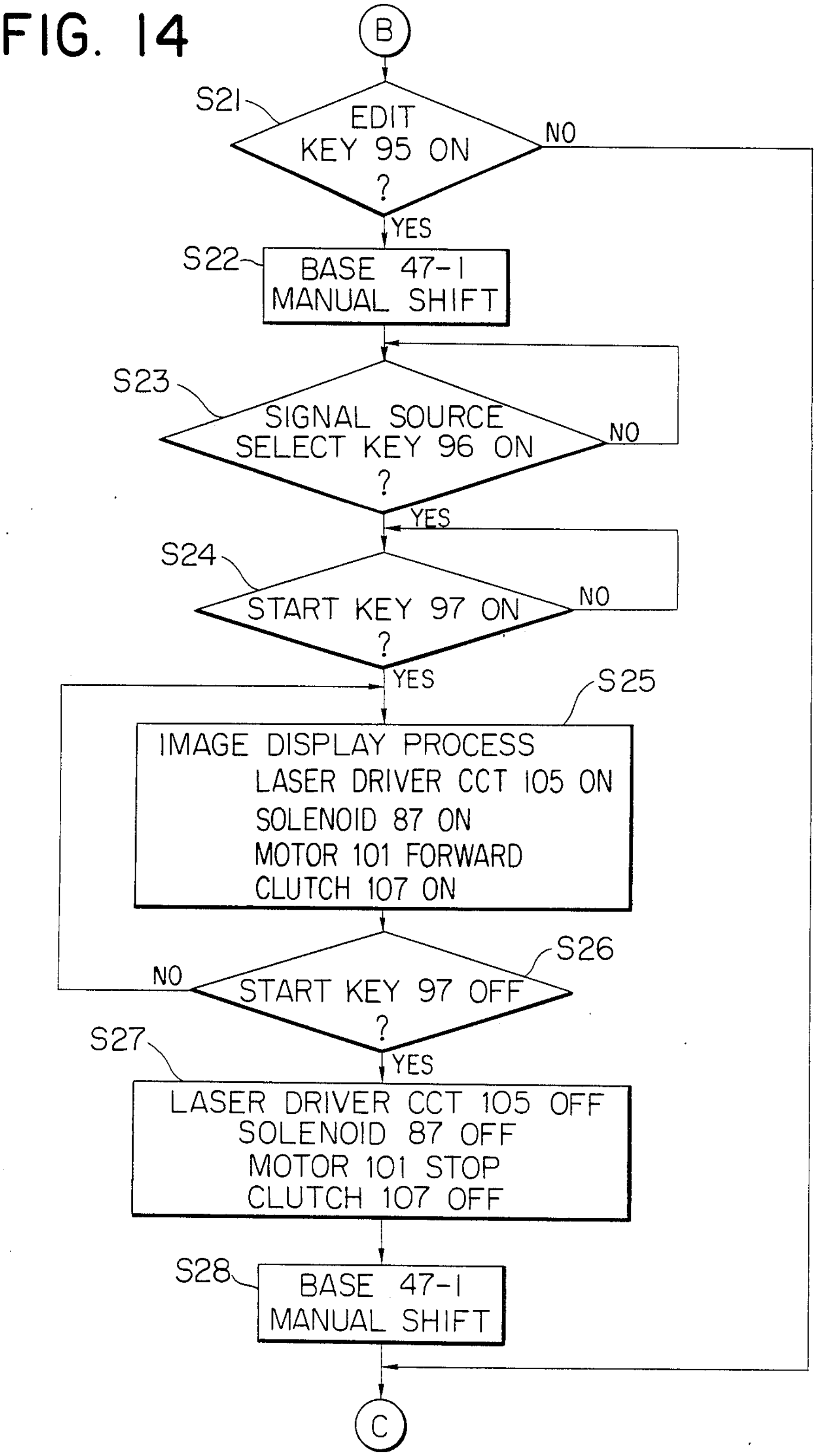

FIG. 14 shows a flow chart of the edit process shown in FIG. 12.

In a step S21, the entry of the edit key 95 is checked. If it has been depressed, the program proceeds to a step S22. In step S22, the operator moves the table 47-1 by the lever 88 to a desired edit position while he/she watches the displayed image. Accordingly, the control circuit does not actually operate in step S22.

In a step S23, the entry of the signal source selection key 96 is checked, and if it has been depressed, the signal source corresponding to the input from the signal source selection key 96 is selected and the program proceeds to a step S24. In the step S24, the entry of the start key 97 is checked, and if it has been depressed, the program proceeds to a step S25.

In the step S25, the laser drive circuit 105 and the solenoid 87 are energized, the drive source 101 is rotated forward and the clutch 107 is connected. Thus, the table 47-1 is moved forward. The forward movement continues while the operator depresses the start key 97.

In a step S26, whether the depression of the start key 97 has been stopped or not is checked, and if it has been stopped, the program proceeds to a step S27. In the step S27, the laser drive circuit 105 and the solenoid 87 are deenergized, the drive source 101 is stopped and the clutch 107 is disconnected. Thus, the table 47-1 is stopped.

In a step S28, the operator moves the table 47-1 to the back position (double-dot chain line position in FIG. 9). In this state, the operator can view the entire area of the edited image. In step S28, the control circuit does not actually operate.

If the edit key 25 has not been depressed in a step S21, the above edit process is not carried out and the program proceeds to the next step.

Figure 15:
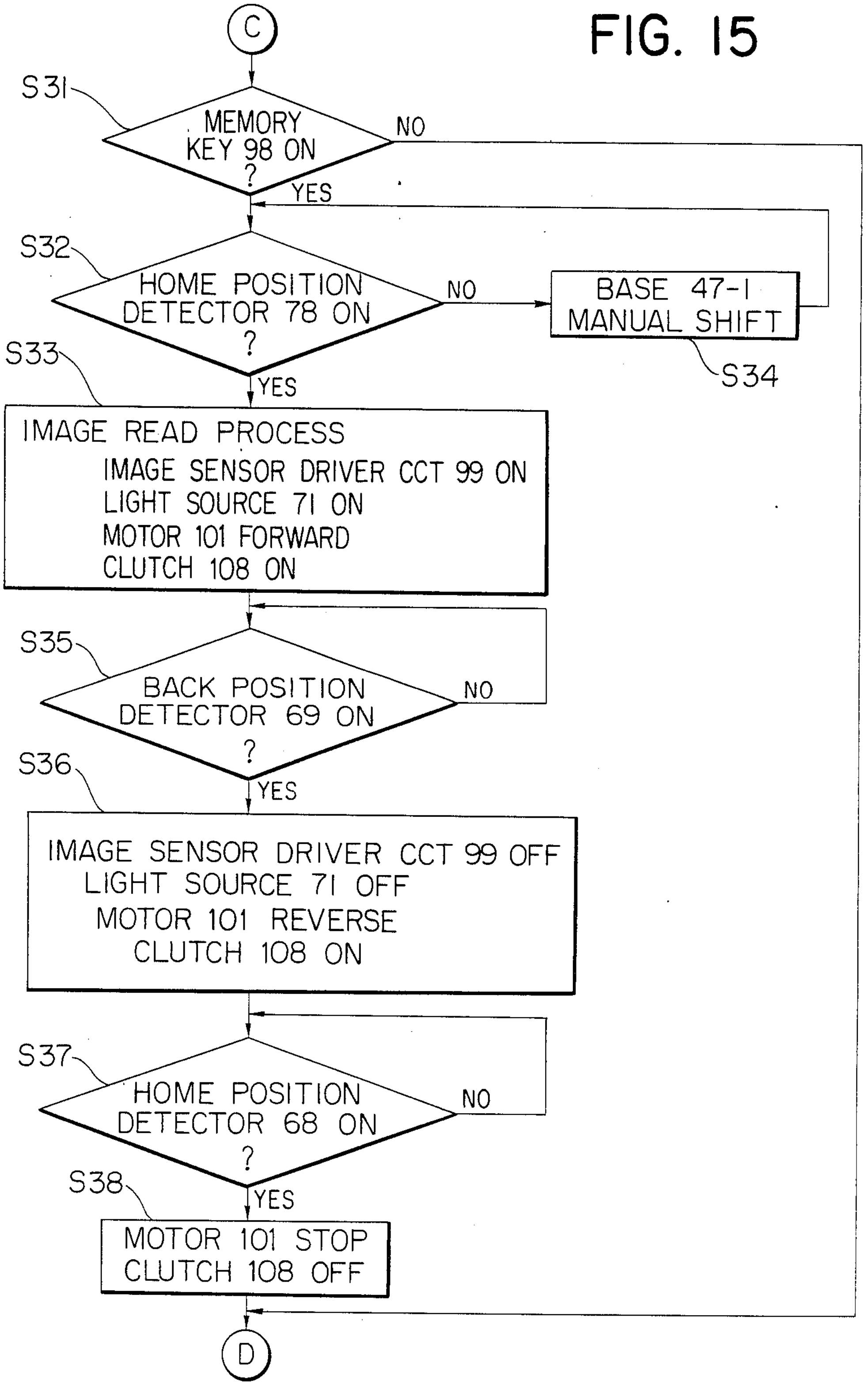

FIG. 15 shows a flow chart of the readout process shown in FIG. 12.

In a step S31, the entry of the memory key 98 is checked. If it has been depressed, the program proceeds to a step S32.

In the step S32, whether or not the table 47-1 is at the back position (double-dot chain line position in FIG. 9) is checked, and if it is at the back position, the program proceeds to a step S33.

If the table 47-1 is not at the back position in step S32, the program proceeds to a step S34 where the operator moves the table 47-1 to the back position. In the step S34, the control circuit does not actually operate. In the step S34, the drive source 101 may be turned on by the control circuit so that the table 47-1 is forcibly returned to the back position.

In step S33, the image sensor drive circuit 99 and the light source 71 are energized, the drive source 101 is rotated forward and the clutch 108 is connected. The readout means 75 is moved forward from the home position (solid line position in FIG. 9).

When the back position sensor 69 detects that the readout means 75 has reached the back position (double-dot chain line position in FIG. 9) in a step S35, the program proceeds to a step S36.

In the step S36, the image sensor drive circuit 99 and the light source 71 are deenergized and the drive source 101 is reversed. The clutch 108 is kept connected. Thus, the readout means 75 is reversed at the back position (double-dot chain line position in FIG. 9) and moved backward.

When the home position sensor 68 detects that the readout means 75 has been returned to the home position in a step S37, the program proceeds to a step S38. In step S38, the drive source 101 is stopped and the clutch 108 is disconnected. Thus, the readout means 75 is stopped.

If the memory key 98 has not been depressed in step S31, the readout process is not carried out and the program proceeds to the next step, that is, Ⓐ in FIG. 13.

The present invention is not limited to the embodiments described above but various modifications may be made within a scope of the appended claims.

What I claim is:

1. An image display device comprising:

an image bearing member fixed and formed in a shape of a plate;

means for forming an erasable and visible image on said image bearing member in response to an electric signal, wherein said image forming means includes developing means having developer and wherein said visible image is an image developed by said developing means;

a display station for visually displaying the image formed on said image bearing member; and reading means for reading the visible image on said image bearing member and producing an image signal, wherein said reading means moves along said image bearing member in order to read said visible image and wherein said reading means operates independently of the operation of said image forming means.

2. An image display device according to claim 1 further comprising memory means for storing the image signal produced by said reading means.

3. An image display device according to claim 1 further comprising manually operable means for operating said image forming means and control means for controlling said image forming means in accordance with the input from said manually operable means.

4. An image display device according to claim 3 wherein said manually operable means includes key input means for starting the reading operation of said reading means, and said control means controls said reading means in accordance with the input from said key input means.

5. An image display device according to claim 1 further comprising manually operable means for starting the reading operation of said reading means, and control means for controlling said reading means in accordance with the input from said manually operable means.

6. An image display device according to claim 1 wherein said image bearing member is a plate and has a conductive layer on a first side and a photoconductive layer on a second side, and is fixed.

7. An image display device according to claim 1 wherein said image forming means includes irradiation means for irradiating a beam in response to said electric signal to said image bearing member and said developing means develops an image on said image bearing member to which said beam has been irradiated.

8. An image display device according to claim 1 wherein said image bearing member comprises a photoconductor.

9. An image display device according to claim 1 wherein said image forming means utilizes an electric photographic process.

10. An image display device according to claim 1 wherein the operation of said image forming means is interrupted while said reading means is being operated.

11. An image display device according to claim 1 wherein said developing means moves along said image bearing member in order to form said visible image.

12. An image display device comprising:

an image bearing member fixed and formed in the shape of a plate;

means for forming a visible image on said image bearing member, wherein said visible image is formed in response to an electric signal, wherein said image forming means includes developing means having developer, wherein said visible image is an image developed by said developing means, and wherein said developing means moves along said image bearing member in order to form said visible image;

a display station for visually displaying the visible image formed on said image bearing member; and control means for controlling said image forming means to alter a desired portion of the visible image formed on said image bearing means, wherein said control means includes moving means for enabling said developing means to move to a desired position on said image bearing member.

13. An image display device according to claim 12 further comprising command means for commanding alteration of the desired portion of the image formed on said image bearing member.

14. An image display device according to claim 13 wherein said control means controls said image forming means while a command signal is being output from said command means.

15. An image display device according to claim 12 further comprising reading means for reading the visible image on said image bearing member and outputting an image signal.

16. An image display device according to claim 15 further comprising command means for commanding start of the reading operation of said reading means, wherein said control means controls said reading means in accordance with the input from said command means.

17. An image display device according to claim 15 further comprising memory means for storing the image signal produced by said reading means.

18. An image display device according to claim 12 wherein said image bearing member is a plate and has a conductive layer on a first side and a photoconductive layer on a second side, and is fixed.

19. An image display device according to claim 12 wherein said image forming means includes irradiation means for irradiating a beam to said image bearing member and said developing means develops the image on said image bearing member to which said beam has been irradiated.

20. An image display device according to claim 12 wherein said developing means moves along said image bearing member in order to form said visible image.

21. An image display device according to claim 12 wherein said image bearing member comprises a photoconductor.

22. An image display device according to claim 12 wherein said image forming means utilizes an electric photographic process.

* * * * *

UNITED STATES PATENT AND TRADEMARK OFFICE
CERTIFICATE OF CORRECTION

PATENT NO. : 4,760,410 Page 1 of 2

DATED : July 26, 1988

INVENTOR(S) : Hirotoshi Kishi

It is certified that error appears in the above-identified patent and that said Letters Patent is hereby corrected as shown below:

COLUMN 1

Line 43, "rear" should be deleted.
Line 45, "keep" should read --maintain--.

COLUMN 2

Line 10, "tner 18" should read --toner 18--.
Line 11, "to" should be deleted.
Line 20, "to" should read --on--.
Line 45, "tner" shoudl read --toner--.

COLUMN 3

Line 45, "a" (second occurrence) should be deleted.
Line 54, "prespective" should read --perspective--.

COLUMN 4

Line 58, "union" should read --unison--.

COLUMN 5

Line 9, "union" should read --unison--.
Line 34, "35a, 36a, 47a, 47a," should read --35a, 36a, 47a, 37a,--.
Line 53, "planer" should read --planar--.

UNITED STATES PATENT AND TRADEMARK OFFICE

CERTIFICATE OF CORRECTION

PATENT NO. : 4,760,410

DATED : July 26, 1988

INVENTOR(S) : Hirotoshi Kishi

It is certified that error appears in the above-identified patent and that said Letters Patent is hereby corrected as shown below:

COLUMN 7

Line 2, "and" should read --is--.
Line 55, "positions" should read --position--.
Line 59, "detecting or" should read --detecting whether or--.

COLUMN 9

Line 61, "positio" should read --position--.
Line 51, "developing unit 10" should read --developing unit 40-1--.

COLUMN 10

Line 19, "nor" should read --or--.

COLUMN 11

Line 28, "edit key 25" should read --edit key 95--.

Signed and Sealed this

Ninth Day of May, 1989

*Attest:*

DONALD J. QUIGG

*Attesting Officer* *Commissioner of Patents and Trademarks*